Patented Mar. 23, 1954

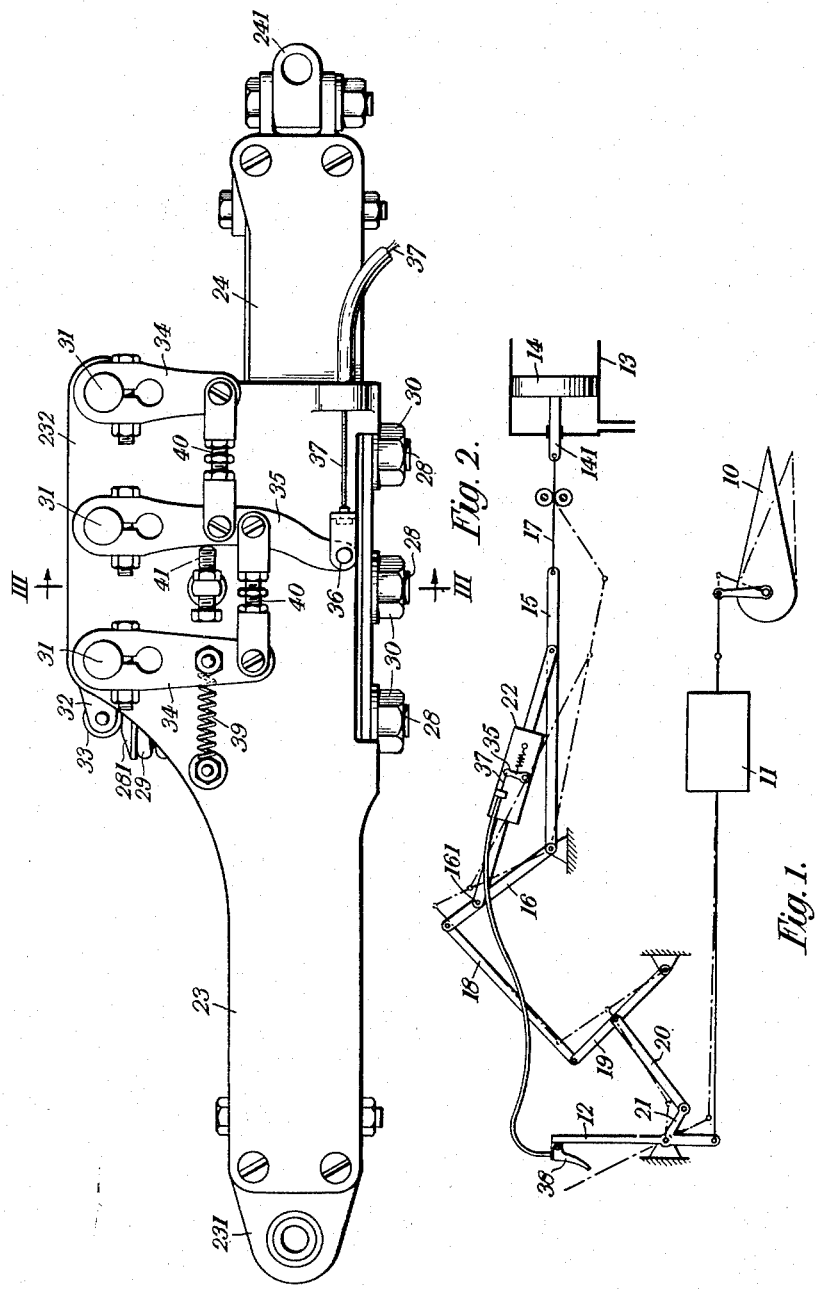

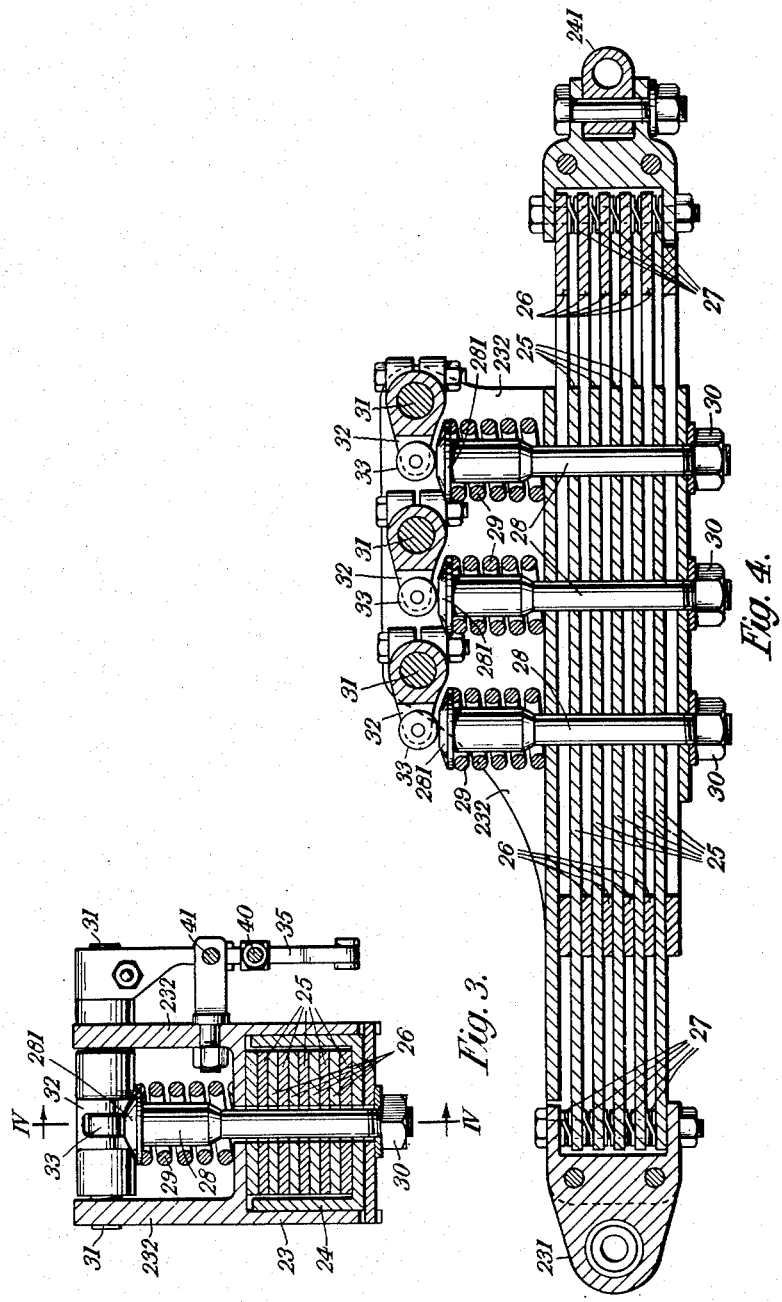

2,673,049

UNITED STATES PATENT OFFICE 2,673,049

POWER-OPERATED FLYING CONTROL
SYSTEM FOR AIRCRAFT

Henry Alfred Talbot, Weybridge, England, assignor to Vickers-Armstrongs Limited, London, England Application November 16, 1951, Serial No. 256,787

Claims priority, application Great Britain
December 12, 1950

4 Claims. (Cl. 244—83)

1

The invention is concerned with power-operated flying control systems for aircraft, i. e. where the actuation of the control organs is assisted or performed entirely by powered means under the control of the pilot. It is desirable in such systems to provide means which create at the pilot's control column an artificial "feel" or resistance to movement simulating that which is experienced in the case of a manually operated control system without powered assistance, such artificial "feel" being proportional in degree to the aerodynamic loads on the surfaces of the control organs. A further desideratum is the provision of means affording a variable datum for the neutral position of the pilot's control column, at which the forces acting thereon are zero, so as to trim the aircraft for all conditions of flight.

These requirements have heretofore been met by connecting the control column through a mechanical linkage with a pneumatic device sensitive to variations of air speed, whereby a force tending to centralise the column is altered in its intensity in accordance with air speed fluctuations, and in order that such an arrangement might be trimmed there was included in the linkage a bell-crank lever of which the angle between the two arms was regulated as desired by an electrical actuator. Such known apparatus suffers, however, from the disadvantage that it does not provide the pilot with a constant indication of the relative positions of the arms of the bell-crank lever—which is a desirable precaution against over-trimming, or even trimming in the wrong direction—nor does it afford means for disengaging the "feel" system from the main control system in the event of a failure of the former. The object of the present invention is to provide, in a "feel" system such as has been described, alternative means for adjusting the relative angular disposition of the arms of the bell-crank lever, whereby the aforesaid disadvantages may be avoided.

According to the invention the artificial feel-simulating apparatus of an aeroplane control system includes a mechanical linkage associated with the control column (or its equivalent), said linkage incorporating a bell-crank lever the relative angular disposition of the arms of which is determined by an extensible or contractible link. Said link comprises two elements (or sets of elements) which are respectively attached to said arms of the bell-crank lever, and which are provided with means, operable at the pilot's will, for clutching said elements together so as to

2 determine the effective length of the link or for temporarily disengaging said elements to permit an adjustment in the length of the link to provide a different trim.

One embodiment of this invention is illustrated in, and is hereinafter described with reference to, the accompanying diagrammatic drawings. In said drawings Fig. 1 is a schematic diagram of the mechanism employed to operate an aeroplane control surface, such as an elevator, in conjunction with an adjustable feel-simulating device in accordance with the invention. Fig. 2 is an elevation of the mechanical linkage associated with the bell-crank lever of the feel-simulator, and Figs. 3 and 4 are sections taken on the line III—III of Fig. 2, and on the line IV—IV of Fig. 3 respectively.

Referring to Fig. 1, it will be seen that the elevator 10 is coupled to a servomotor 11 which is in turn actuated by a control column 12. The feel-simulating device which is associated with the control column 12 comprises the conventional elements of a pneumatic detector which is sensitive to fluctuations of air speed (including a cylinder 13 and a piston 14 working thereon), and a bell-crank lever 15, 16 of which the arm 15 is connected by a flexible member 17 to the rod 141 of said piston 14, whilst the arm 16 is connected by a suitable transmitting linkage 18, 19, 20 to an arm 21 fixed on the control column 12.

The relative angular disposition of the arms, 15, 16 of the bell-crank lever is determined by an extensible or contractible link, indicated in Fig. 1 by the reference numeral 22, the opposite extremities of which are pivotally attached to the said arms 15, 16 at 151 and 161 respectively. In the embodiment illustrated said link 22 incorporates the multi-plate clutch shown in Figs. 2 to 4, which comprises two members 23, 24 of channel-section and adapted to slide one within the other so as to enclose between them a longitudinal housing, the member 23 being yoked by a lug 231 to the bell-crank lever arm 15 and the other member 24 by a lug 241 to the arm 16 thereof. In said housing are contained two sets of interleaved plates, one set 25, 25, etc., being attached at one end to the channel-member 23 and the other set 26, 26, etc., being attached at the other end to the other channel-member 24. Light spring separators 27 are used to space the individual plates of each set.

Three bolts 28 pass through the assembly, the outer channel-member 23 and the clutch plates 25 attached thereto being drilled to receive said bolts 28, whilst the inner channel-member 24 and the plates 26 attached thereto are slotted lengthwise to receive the bolts 28. Said bolts 28 are loaded by compression springs 29 adjustable by means of nuts 30 screwing on the bolts.

The outer channel-member 23 is furnished with lateral cheeks 232 which provide a mounting for three torque spindles 31 each of which carries a rocker arm 32 furnished at its free extremity with a tappet 33 arranged to bear upon the head 281 of one of the said spring-loaded bolts 28. Levers 34 fixed on the two endmost spindles 31 are linked to a master lever 35 on the central spindle 31, which lever 35 is in turn coupled at 36 to a cable 37 leading to an operating lever 38 in the cock-pit. A suitable return spring for said master lever is provided at 39.

The three rocker arms 32 are preferably set (e. g. by means of adjustable connections 40 between their levers 34 and the master lever 35, and an adjustable stop 41 for the latter), so that when the master lever 35 is operated the spring-loaded bolts 28 are depressed progressively, thus providing a smooth progressive disengagement of the clutch plates 25, 26.

The arrangement is such that when the clutch is released by actuating the lever 35 the gripping engagement of the plates 25, 26 is relaxed, when endwise movement of one set of plates in relation to the other set can be effected to produce an extension or contraction of the effective length of the link 22.

In order to trim the elevator 10 the pilot releases the clutch, whereupon the feel datum is automatically adjusted to correspond to the instantaneous position of the control column 12 in which the parts are in equilibrium, whereupon the clutch is re-locked in the new position.

It will be appreciated that such an arrangement does not require an indicator to show the relative position of the arms 15, 16 of the bell-crank lever, since the clutch cannot over-run or operate in the incorrect sense; nor are auxiliary means of disengagement required in the event of a failure of the "feel" system since in such circumstances the clutch itself can be released. Additional advantages accruing to this device are that it obviates the complication of electric circuits.

What I claim as my invention and desire to secure by Letters Patent is:—

1. An aeroplane control system, comprising a control surface, a control column, a servo-motor, operative connections between said servo-motor and the control column respectively, a pneumatic detector sensitive to fluctuations in air speed, a linkage connecting said detector to said control column, said linkage including a bell-crank lever having relatively angularly movable arms, and a link connected between said arms, said link comprising two elements which are respectively attached to said arms of the bell-crank lever and means, operable at the pilot's will, for clutching said elements together, so as to determine the effective length of the link and for temporarily disengaging said elements.

2. An aeroplane control system, comprising a control surface, a control column, a servo-motor, operative connections between said servo-motor and the control column respectively, a pneumatic detector sensitive to fluctuations in air speed, a linkage connecting said detector to said control column, said linkage including a bell-crank lever having relatively angularly movable arms, and a link connected between said arms, said link comprising a multi-plate clutch, having two interleaved sets of plates, each set being connected to one of the arms of the bell-crank lever, spring-pressed means for holding said sets of plates in operative engagement, rocker and tappet mechanism to compress the springs governing said spring-pressed means to relieve the pressure on the plates, remote operating means, and means connecting said mechanism with said remote operating means.

3. An apparatus as claimed in claim 2, said clutch comprising two channel-section members slidable one within the other and combining to constitute a housing for said clutch plates, means at the opposite ends of said respective channel members for attaching them respectively to the arms of said bell-crank lever, means attaching one set of clutch plates at one end to one of said channel-members, means attaching the other set of clutch-plates at the opposite end to said other channel-member, and resilient means separating the individual plates of each set.

4. An apparatus as claimed in claim 2, said rockers and tappets being so interlinked that when operated the rockers are actuated progressively.

HENRY ALFRED TALBOT.

References Cited in the file of this patent

UNITED STATES PATENTS

| Number | Name | Date |
|---|---|---|
| 418,907 | Buckley | Jan. 7, 1890 |
| 2,205,610 | Van Nes | June 25, 1940 |
| 2,428,194 | Bockrath | Sept. 30, 1947 |
| 2,508,883 | Knowler et al. | May 23, 1950 |
| 2,528,752 | Jacobus | Nov. 7, 1950 |
| 2,639,875 | Vogel | May 26, 1953 |

FOREIGN PATENTS

| Number | Country | Date |
|---|---|---|
| 668,292 | Germany | Dec. 30, 1934 |

OTHER REFERENCES

National Advisory Committee for Aeronautics, Oct. 1951, Technical Note 2496. Figure 4 (page 22).